United States Patent
Chen et al.

(10) Patent No.: US 11,114,753 B2
(45) Date of Patent: Sep. 7, 2021

(54) ANTENNA WINDOWS FOR BASE COVERS

(71) Applicant: HEWLETT-PACKARD DEVELOPMENT COMPANY, L.P., Houston, TX (US)

(72) Inventors: Po-Chao Chen, Taipei (TW); Kuan-Jung Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 605 days.

(21) Appl. No.: 16/075,656

(22) PCT Filed: Mar. 27, 2017

(86) PCT No.: PCT/US2017/024204
§ 371 (c)(1),
(2) Date: Aug. 5, 2018

(87) PCT Pub. No.: WO2018/182563
PCT Pub. Date: Oct. 4, 2018

(65) Prior Publication Data
US 2021/0203067 A1    Jul. 1, 2021

(51) Int. Cl.
*H01Q 1/40*   (2006.01)
*G06F 1/16*   (2006.01)
*H01Q 1/22*   (2006.01)
*H01Q 1/24*   (2006.01)
*H01Q 13/10*  (2006.01)

(52) U.S. Cl.
CPC ........... *H01Q 1/405* (2013.01); *G06F 1/1698* (2013.01); *H01Q 1/2266* (2013.01); *H01Q 1/2291* (2013.01); *H01Q 1/243* (2013.01); *H01Q 13/10* (2013.01)

(58) Field of Classification Search
CPC .............................. H01Q 1/405; H01Q 1/2266
USPC ......................................................... 343/702
See application file for complete search history.

(56) References Cited

U.S. PATENT DOCUMENTS

| | | |
|---|---|---|
| 8,489,162 B1 | 7/2013 | Dou et al. |
| 8,659,497 B2 | 2/2014 | Tang et al. |
| 9,471,201 B1 | 10/2016 | Truong et al. |
| 2003/0097510 A1 | 5/2003 | Joseph |
| 2005/0268086 A1 | 12/2005 | Kim |
| 2011/0080703 A1 | 4/2011 | Schlesener et al. |

(Continued)

FOREIGN PATENT DOCUMENTS

| | | |
|---|---|---|
| CN | 102929565 A | 2/2013 |
| CN | 105789883 A | 7/2016 |

(Continued)

OTHER PUBLICATIONS

"Magnesium Alloys", Reddit Inc., Retrieved from Internet: https://www.reddit.com/r/apple/comments/1ung1q/why_apples_macbook_are_made_of_aluminium/, 2014, 6 Pages.

*Primary Examiner* — Peguy Jean Pierre
(74) *Attorney, Agent, or Firm* — HPI Patent Department

(57) ABSTRACT

In one example, a base cover for a lower housing of a convertible device is described, which may include a metal body and an antenna window attached to the metal body. The antenna window may include a non-metallic structure and a metallic structure disposed within the non-metallic structure such that the metallic structure corresponds to an antenna slot defined in an upper housing of the convertible device.

14 Claims, 5 Drawing Sheets

(56) References Cited

U.S. PATENT DOCUMENTS

| | | | |
|---|---|---|---|
| 2011/0260931 A1 | 10/2011 | Tsai et al. | |
| 2014/0281464 A1 | 9/2014 | Le et al. | |
| 2015/0255851 A1 | 9/2015 | Guterman et al. | |
| 2015/0270619 A1 | 9/2015 | Zhu et al. | |
| 2016/0154438 A1 | 6/2016 | Sato | |
| 2016/0252930 A1 | 9/2016 | Senatori et al. | |
| 2016/0320797 A1 | 11/2016 | Ram | |
| 2017/0309993 A1* | 10/2017 | Tu | H01Q 13/10 |
| 2018/0212305 A1* | 7/2018 | Wei | H01Q 5/385 |
| 2019/0237848 A1* | 8/2019 | Ramasamy | G06F 1/1677 |
| 2019/0294216 A1* | 9/2019 | Ting | G06F 1/1681 |

FOREIGN PATENT DOCUMENTS

| | | | |
|---|---|---|---|
| EP | 1645939 A2 | 4/2006 | |
| EP | 1975762 A1 | 10/2008 | |
| EP | 2703935 A2 | 3/2014 | |
| WO | WO-2010005423 | 1/2010 | |

\* cited by examiner

ANTENNA WINDOWS FOR BASE COVERS

BACKGROUND

Portable computers have evolved from transportable suitcase style computers, to laptops or notebooks, and then to slate personal computers (PCs) (also referred to as "tablets" or "pure tablets"). Convertible devices may combine features of both tablets and laptops. Convertible devices may be used in both a laptop mode and a tablet mode. In the tablet mode, a lid is closed with a liquid crystal display (LCD) facing up and viewable. In the laptop mode, the lid is open in an upright position with respect to a main body of the convertible device. Antennas, such as those used for wireless communications, can be located at an upper edge of the lid for better radio frequency clearance.

BRIEF DESCRIPTION OF THE DRAWINGS

Examples are described in the following detailed description and in reference to the drawings, in which.

DETAILED DESCRIPTION

Figure 1:
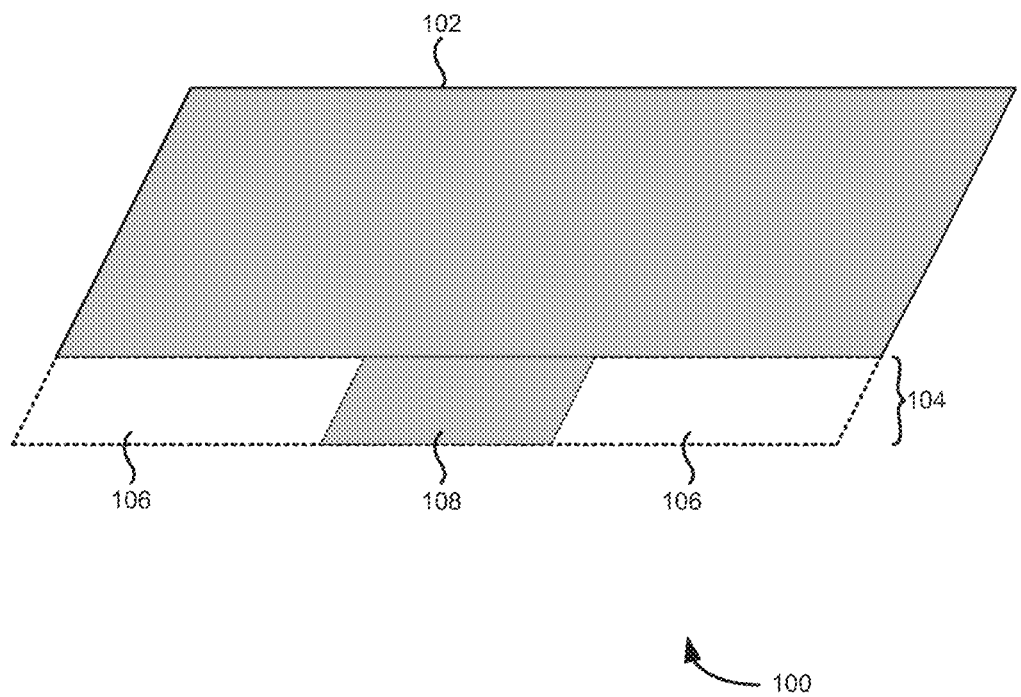
FIG. 1 is a perspective view of an example base cover of a convertible device showing an antenna window.

Convertible devices may be configured in either a laptop mode or a tablet mode. Convertible devices may include a linking member, a lower housing (e.g., a keyboard housing), and an upper housing (e.g., display housing). The linking member, such as two hinges, may interconnect the lower housing with the upper housing. In the laptop mode, the convertible device may be used as a regular laptop. In the laptop mode, the lower housing may form an angle between about 90° and 180° relative to the upper housing with the linking member attached at the back of the upper housing. In the tablet mode, the upper housing may be substantially parallel to and adjacent to the lower housing of the convertible device.

Convertible devices may include a clamshell design having a track pad located on a same surface as a keyboard. The clamshell design may have two sections, the display housing and the keyboard housing, and four surfaces, "A" cover (i.e., a screen cover/display cover of the display housing) opposite to a display, "B" cover (i.e., a bottom cover of the display housing) on which the display is visible, "C" cover (i.e., top cover of the lower housing) on which the keyboard and track pad are located, and "D" cover (i.e., base cover of the lower housing) on which the device rests. Antennas used for wireless communications can be located at an upper edge of the display housing for radio frequency clearance.

For convertible devices, the antennas may need to work for both laptop/notebook mode and tablet mode. However, the antennas may be tuned for one mode and de-tuned for the other mode. The antennas may be positioned in a display side, close to a front bezel and a top of the display housing. For antennas placed on the top of the display housing (e.g., "A" cover), when turned to the tablet Mode, the antennas may become close to the base cover ("D" cover) of the convertible device, and will have the "D" cover to create a plastic window (e.g., replacing the original metal part) to avoid antenna gain degradation due to close to metal body. However, dielectric loading of the plastic window may have antenna frequency shift and can cause antenna gain degradation. For example, for slot wireless local area network (WLAN) antennas provided on the top of the display housing (e.g., "A" cover), the dielectric loading of the plastic window on "D" cover may cause a frequency shift up to 200 megahertz (MHz).

Examples described herein may provide a convertible device including an upper housing and a lower housing to couple with the upper housing. The upper housing may include a screen carried on a first side (e.g., "B" cover), a screen cover carried on a second side (e.g., "A" cover) having an antenna slot, and an antenna corresponding to the antenna slot. For example, the antenna may be a slot antenna formed in the upper housing. Further, the lower housing may include a base cover (e.g., "D" cover) defining an antenna window. The antenna window may include a metallic structure that corresponds to the antenna slot. In one example, the antenna window may include a non-metallic structure and the metallic structure is disposed in the non-metallic structure such that the metallic structure is formed substantially below the antenna slot of the screen cover when the convertible device is operating in the tablet mode. A combination of metallic structure (e.g., metal window) and non-metallic structure (e.g., plastic window) on "D" cover under the WLAN antenna slot area may not cause significant frequency shift when the convertible device is changed from the laptop mode to the tablet mode. The term "antenna slot" may refer to an opening or a portion of the screen cover that corresponds to an antenna region of the convertible device.

Turning now to figures, FIG. 1 is a perspective view of an example base cover 100 of a convertible device showing an antenna window 104. The convertible device may include an upper housing and a lower housing. The lower housing may include the base cover 100 on which the device rests. Base cover 100 may include a metal body 102 and antenna window 104 attached to metal body 102. In one example, antenna window 104 may be attached to a front side of metal body 102 to form base cover 100.

Antenna window 104 may include a non-metallic structure 106 and a metallic structure 108 disposed within non-metallic structure 106 such that metallic structure 108 corresponds to an antenna slot defined in the upper housing of the convertible device. Example non-metallic structure 106 may include a plastic structure. In one example, a combination of metallic structure 108 and non-metallic structure 106 of antenna window 104 may avoid antenna gain degradation when antennas in the upper housing become close to base cover 100 (e.g., metal body) when the convertible device is operated in tablet mode. In one example, metal body 102 and metallic structure 108 may a single structure or separate structures.

In one example, metallic structure 108 may be formed substantially below the antenna slot of the upper housing when the convertible device is operated in a tablet mode. In another example, a combination of non-metallic structure 106 and metallic structure 108 may be formed substantially below the antenna slot when the convertible device is operated in the tablet mode. For example, disposing metallic structure 108 substantially below the antenna slot may not cause significant frequency shift when the convertible device is changed from the laptop mode to the tablet mode. This is explained in detail in FIGS. 2-6.

Figure 2:
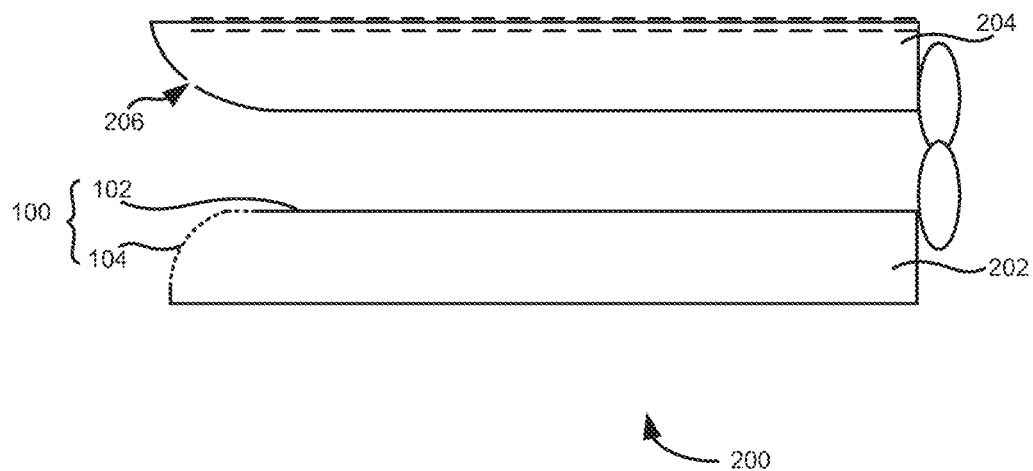
FIG. 2 is a side view of an example electronic device including the base cover, such as the base cover shown in FIG. 1.

FIG. 2 is a side view of an example electronic device 200 including base cover 100 as shown in FIG. 1. Electronic device 200 may include a lower housing 202 and an upper housing 204 pivotally coupled to lower housing 202 for movement between a tablet mode and a laptop mode. Upper housing 204 may define an antenna slot 206. For example, antenna slot 206 may be a rectangular slot. In the tablet mode as shown in FIG. 2, lower housing 202 is substantially parallel and adjacent to upper housing 204. Lower housing 202 may include a keyboard or similar input device and/or a track pad on a top surface of lower housing 202 to provide mouse control type inputs to electronic device 200. Optionally, other input type devices such as a track stick or track ball may be included on lower housing 202.

Further, lower housing 202 may include base cover 100 opposite to the top surface. Lower housing 202 may include antenna window 104 disposed in base cover 100. Antenna window 104 may include a non-metallic structure (e.g., non-metallic structure 106 as shown in FIG. 1) and a metallic structure (e.g., metallic structure 108 as shown in FIG. 1) disposed in non-metallic structure 106 such that metallic structure 108 is formed substantially below antenna slot 206 defined in upper housing 204 when electronic device 200 is operating in the tablet mode. This is explained in FIGS. 4A and 5.

In another example, a combination of non-metallic structure 106 and metallic structure 108 is formed substantially below antenna slot 206 when electronic device 200 is operating in the tablet mode. In one example, non-metallic structure 106 may define a gap corresponding to antenna slot 206 (i.e., substantially below antenna slot 206 when electronic device 200 is operated in the tablet mode). Further, metallic structure 108 may be disposed in the gap. This is explained in FIGS. 4B and 6.

Figure 3:
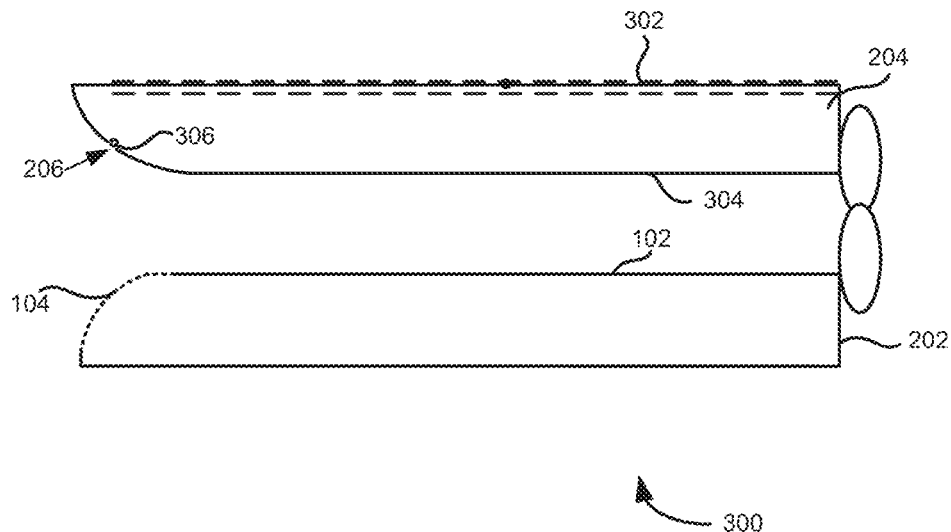
FIG. 3 is a side view of an example convertible device including the base cover, such as the base cover shown in FIG. 1.

FIG. 3 is a side view of an example convertible device 300 including base cover 100. Convertible device 300 may include an upper housing 204 and a lower housing 202 to couple with upper housing 204. Upper housing 204 may include a screen 302 (i.e., display) carried on a first side and a screen cover 304 carried on a second side having antenna slot 206 (also referred to as a hole, an aperture, or a slot in screen cover 304).

Convertible device 300 may include a processor within lower housing 202. Screen 302 may be a liquid crystal display (LCD), which may be a touch sensitive screen, for example, may be disposed in upper housing 204. The touch sensitive screen may be coupled to be operable by the processor to display data to a user of convertible device 300. Further, upper housing 204 and lower housing 202 may pivot around a linking member (e.g., hinges). Upper housing 204 may be rotatable through an angle of up to substantially 360° while remaining parallel to lower housing 202. In example shown in FIG. 3, convertible device 300 may be converted from the notebook mode to the tablet mode by rotating upper housing 204 away from keyboard of lower housing 202 until screen 302 of upper housing 204 and keyboard of lower housing 202 are disposed on opposite sides of convertible device 300. In the tablet mode, convertible device 300 may be used by an operation with respect to the touch sensitive screen.

Further, upper housing 204 may include antenna 306 corresponding to antenna slot 206. Antenna 306 may be provided in the screen side of upper housing 204 to connect convertible device 300 with a wireless network, such as WLAN netwoks, broadband wireless access (BWA) networks, ultra-wide-band (UWB) networks, Bluetooth™ systems, or cellular-type systems. Example antenna 306 may include, but not limited to, a slot antenna, a dipole antenna, monopole antenna, loop antenna, microstrip antenna, or other types of antennas suitable for transmission of radio-frequency (RF) signals. For example, slot antenna is slot-based antenna formed from antenna slot 206 in a ground plane structure such as metal housing (e.g., screen housing 304) of convertible device 300.

Screen cover 304 may be formed from conductive materials and/or insulating materials. In devices in which screen cover 304 is formed from plastic or other dielectric materials, antenna signals can pass through screen cover 304. Antennas in this type of devices can be mounted behind a portion of screen cover 304. In devices in which screen cover 304 is formed from a conductive material (e.g., metal), one or more radio-transparent antenna windows can be provided in antenna slots in the housing. As an example, a metal housing may have antenna slots that are filled with antenna covers. Antennas may be mounted behind the antenna covers and may transmit and/or receive antenna signals through the antenna covers.

Figure 6:
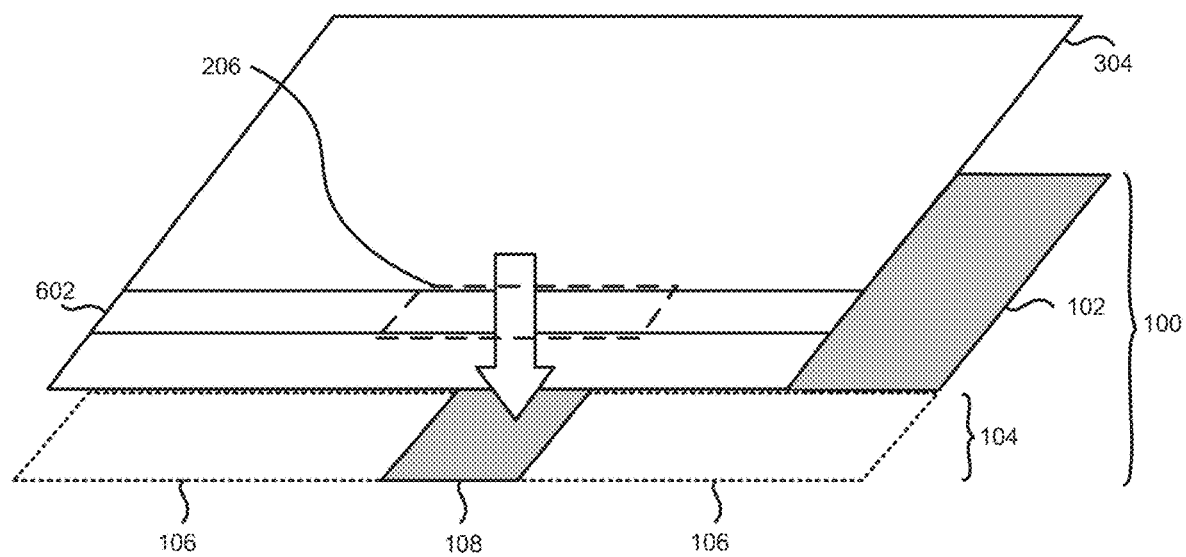
FIG. 6 is an example schematic depicting a screen cover and a base cover having a combination of the non-metallic structure and the metallic structure that is formed substantially below the antenna slot of the screen cover when the convertible device is operated in the tablet mode.

For example, screen cover 304 may include a metal body, and an antenna cover (e.g., antenna cover 602 as shown in FIG. 6) positioned in antenna slot 206 of metal body. The antenna cover on screen cover 304 that covers antenna 306 may be made of non-metallic material so that wireless communications signal may not be absorbed by the antenna cover, thus the receiving capability of antenna 306 may not be degraded by the antenna cover. For example, the antenna cover may be a plastic cover or a cover made of dielectric material.

As shown in FIG. 3, antenna 306 is positioned near a top of upper housing 204. However, antenna 306 may also be positioned at other locations, such as at a side (e.g., left or right side) of upper housing 204 or near the bottom of upper housing 204. In another embodiment, two or more antennas may be formed in upper housing 204. Antenna 306 may be provided in the screen side of upper housing 204 to connect convertible device 300 in the tablet mode with the wireless network.

Lower housing 202 may include base cover 100 defining an antenna window 104. In one example, base cover 100 may be formed by attaching antenna window 104 to metal body 102. Further, antenna window 104 may include non-metallic structure 106 and metallic structure 108 disposed corresponding to antenna slot 206. This is explained in detail in FIGS. 4A and 4B.

Figure 4A:
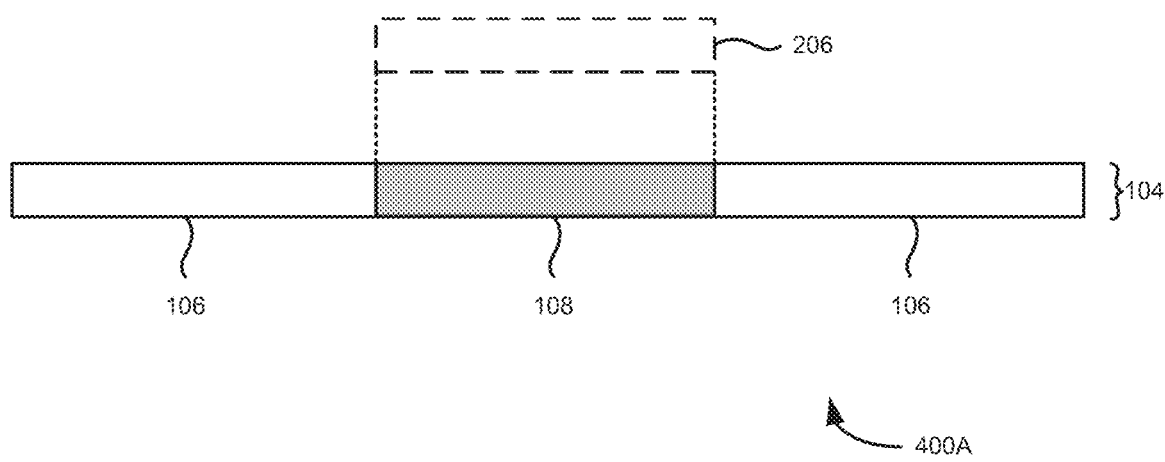
FIG. 4A is a top view of the example antenna window of the base cover, depicting a metallic structure that is formed substantially below an antenna slot of an upper housing when the convertible device is operated in a tablet mode.

FIG. 4A is a top view 400A of the example antenna window 104 of base cover 100, depicting metallic structure 108 that is formed substantially below antenna slot 206 of upper housing 204 when convertible device 300 is operated in the tablet mode. As shown in FIG. 4A, metallic structure 108 is formed substantially below and within a boundary (e.g., left and right boundaries) defined by antenna slot 206 when convertible device 300 is in closed position or when upper housing 204 is opened through an angle of substantially 360° with upper housing 204 remaining parallel to lower housing 202.

Figure 4B:
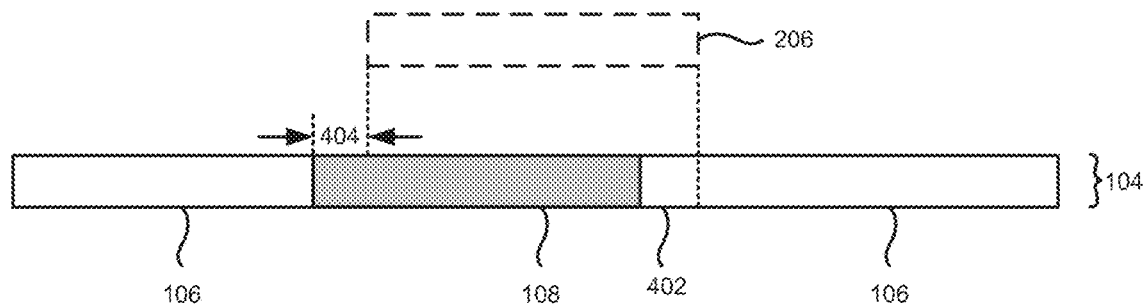
FIG. 4B is a top view of the example antenna window of the base cover, depicting a combination of a non-metallic structure and a metallic structure that is formed substantially below the antenna slot when the convertible device is operated in the tablet mode.

FIG. 4B is a top view 400B of example antenna window 104 of base cover 100, depicting a combination of non-metallic structure 106 and metallic structure 108 that is formed substantially below antenna slot 206 when convertible device 300 is operated in the tablet mode. As shown in FIG. 4B, a combination of non-metallic structure 402 (i.e., a portion of non-metallic structure 106) and metallic structure 108 is formed substantially below antenna slot 206 when convertible device 300 is in closed position or when upper housing 204 is opened through an angle of substantially 360° with upper housing 204 remaining parallel to lower housing 202. In the example shown in FIG. 4B, the metallic structure 108 is formed substantially below and with an offset (e.g., 404) from antenna slot 206.

Figure 5:
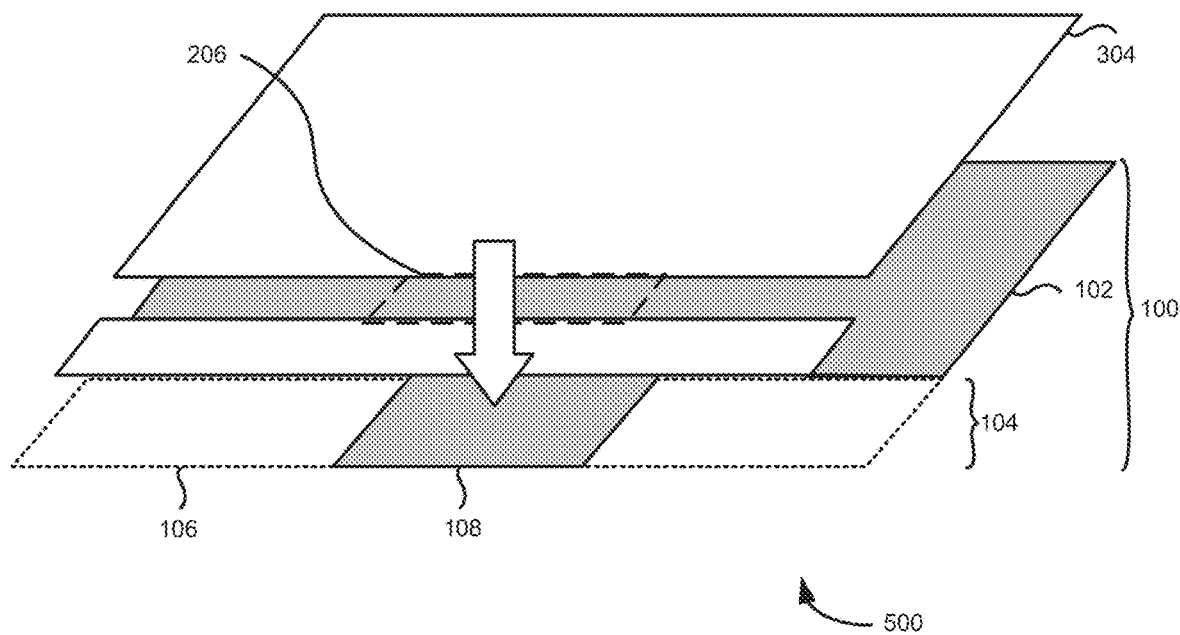
FIG. 5 is an example schematic depicting the screen cover and the base cover having the metallic structure that is formed substantially below the antenna slot of the screen cover when the convertible device is operated in the tablet mode.

FIG. 5 is an example schematic 500 depicting screen cover 304 and base cover 100 having metallic structure 108 that is formed substantially below antenna slot 206 of screen cover 304 when convertible device 300 is operated in the tablet mode. FIG. 6 is an example schematic 600 depicting screen cover 304 and base cover 100 having a combination of non-metallic structure 106 and metallic structure 108 that is formed substantially below and within a boundary defined by antenna slot 206 of screen cover 304 when convertible device 300 is operated in the tablet mode. In the example shown in FIG. 6, antenna cover 602 is positioned in screen cover 304 to cover antenna slot 206. In the example shown in FIGS. 5 and 6, metallic structure 108 is a protrusion that is protruding from metal body 102 such that the protrusion forms substantially below antenna slot 206 when convertible device 300 is operated in the tablet mode. In this case, antenna window is formed by the combination of non-metallic structures 106 and the protrusion (e.g., 108).

Figure 7:
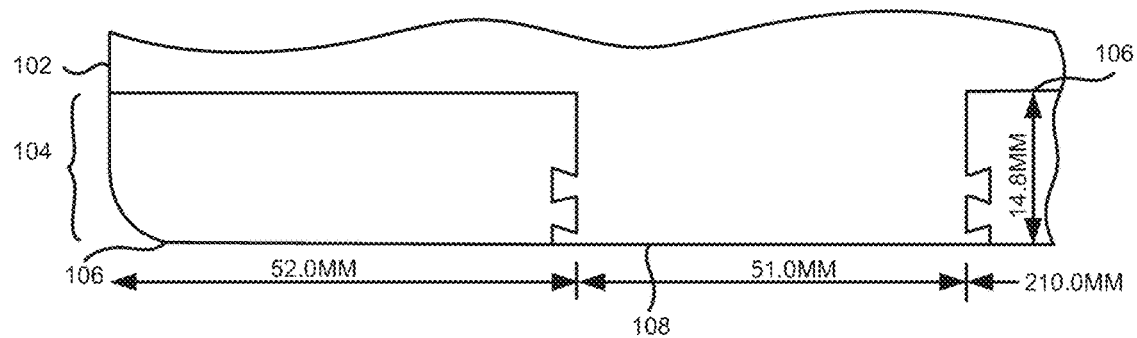
FIG. 7 is a top view of a portion of the base cover depicting an example antenna window that is formed by attaching the non-metallic structure to the metallic structure.

FIG. 7 is a top view 700 of a portion of base cover 100 depicting example antenna window 104 that is formed by attaching non-metallic structure 106 (e.g., plastic window) to metallic structure 108 (e.g., metal window). As shown in FIG. 7, non-metallic structures 106 are attached to the protrusion (e.g., 108) of metal body 102 using, for example, the molding process or glue. In the example shown in FIG. 7, two non-metallic structures of length 52 mm and 210 mm are respectively attached to a left side edge and a right side of the metal protrusion (e.g., 108) of length 51 mm. In the example shown in FIG. 7, antenna window 104 has a width of 14.8 mm. In this case, antenna slot 206 can have a length of 40 mm.

Figure 8:
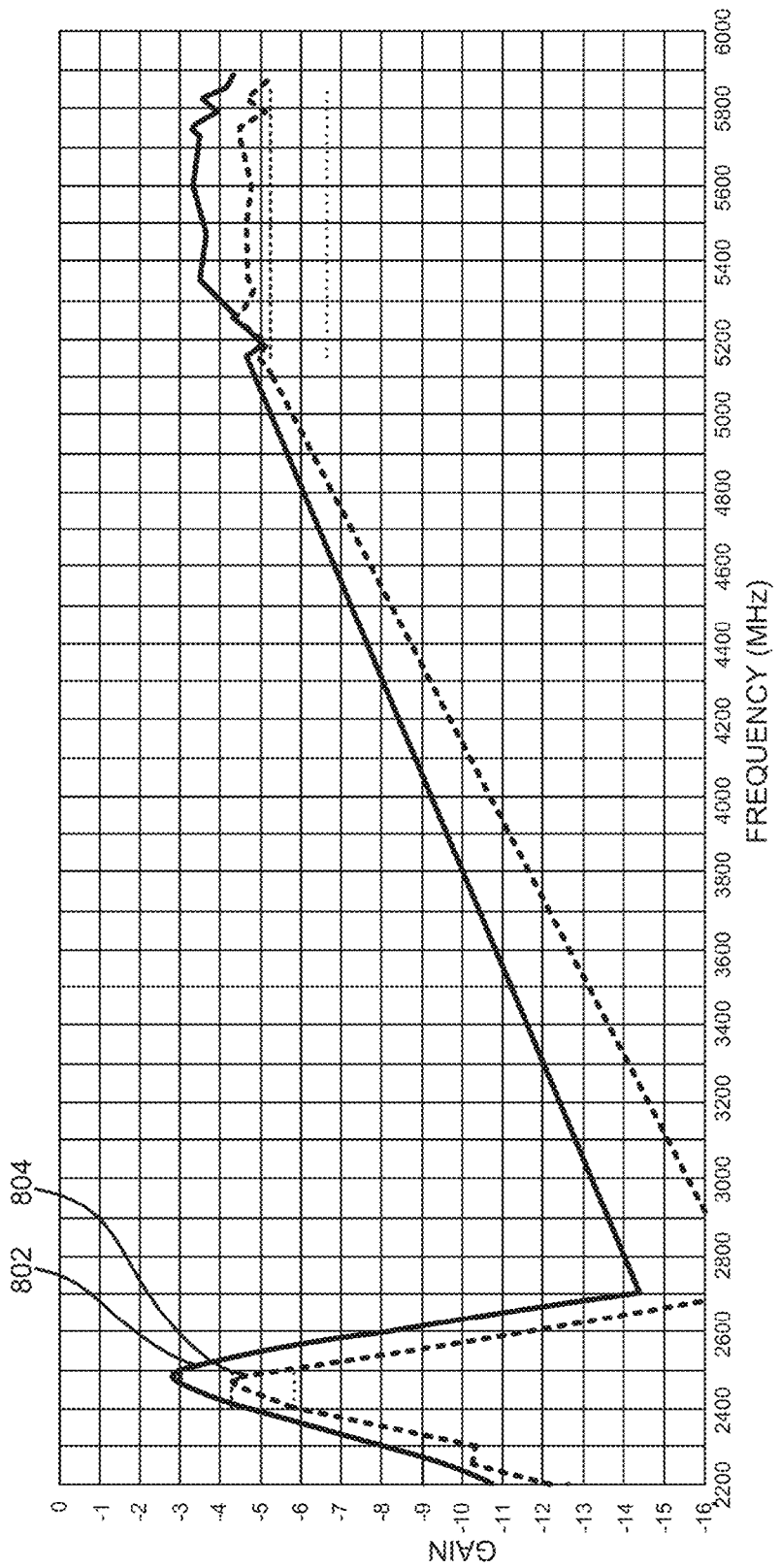
FIG. 8 is an example graph depicting a frequency shift for an antenna placed in the upper housing when the convertible device is changed from the laptop mode to the tablet mode.

FIG. 8 is an example frequency versus gain graph 800 depicting a frequency shift for antenna (e.g., antenna 306) placed in upper housing 204 when convertible device 300 is changed from the laptop mode to the tablet mode. The example graph 800 may depict frequency shift for a WLAN antenna having 2.7 mm antenna slot. Antenna 306 may have an operating frequency curve 802 when convertible device 300 is operated in the laptop mode and an operating frequency curve 804 when convertible device 300 is operated in the tablet mode. As shown in FIG. 8, forming a combination of metal and plastic window on "D" cover under the antenna slot of "A" cover may not cause any significant frequency shift when convertible device 300 is changed from the laptop mode to the tablet mode.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A base cover for a lower housing of a convertible device, comprising:
   a metal body; and
   an antenna window attached to the metal body, wherein the antenna window comprises:
     a non-metallic structure; and
     a metallic structure disposed within the non-metallic structure such that the metallic structure corresponds to an antenna slot defined in an upper housing of the convertible device, wherein the metallic structure is a protrusion that protrudes from the metal body, and wherein the non-metallic structure is attached to the protrusion to form the antenna window.

2. The base cover of claim 1, wherein the metallic structure is formed substantially below the antenna slot of the upper housing when the convertible device is operated in a tablet mode.

3. The base cover of claim 1, wherein a combination of the non-metallic structure and the metallic structure is formed substantially below the antenna slot when the convertible device is operated in a tablet mode.

4. The base cover of claim 1, wherein the antenna window is attached to a front side of the metal body to form the base cover.

5. The base cover of claim 1, wherein the non-metallic structure comprises a plastic structure.

6. An electronic device comprising:
   a lower housing; and
   an upper housing pivotally coupled to the lower housing for movement between a tablet mode and a laptop mode, wherein, in the tablet mode, the lower housing is substantially parallel and adjacent to the upper housing, wherein the lower housing comprises:

a base cover; and
an antenna window disposed in the base cover, wherein the antenna window comprises:
  a non-metallic structure; and
  a metallic structure disposed in the non-metallic structure such that the metallic structure is formed substantially below an antenna slot defined in the upper housing when the electronic device is operating in the tablet mode, wherein the metallic structure is a protrusion that protrudes from the metal body, and wherein the non-metallic structure is attached to the protrusion to form the antenna window.

7. The electronic device of claim 6, wherein a combination of the non-metallic structure and the metallic structure is formed substantially below the antenna slot when the electronic device is operating in the tablet mode.

8. The electronic device of claim 6, wherein the non-metallic structure comprises a gap corresponding to the antenna slot, and wherein the metallic structure is disposed in the gap.

9. The electronic device of claim 6, wherein the base cover comprises a metal body, and wherein the antenna window is attached to the metal body to form the base cover.

10. A convertible device comprising:
an upper housing comprising:
  a screen carried on a first side;
  a screen cover carried on a second side having an antenna slot; and
  an antenna corresponding to the antenna slot; and
a lower housing to couple with the upper housing, wherein the lower housing comprises:
  a base cover defining an antenna window, and wherein the antenna window comprises a non-metallic structure and a metallic structure corresponding to the antenna slot, wherein the metallic structure is formed substantially below and with an offset from the antenna slot when the convertible device is in closed position or when the upper housing is opened through an angle of substantially 360° with the upper housing remaining parallel to the lower housing.

11. The convertible device of claim 10, wherein the metallic structure is formed substantially below the antenna slot when the convertible device is in closed position or when the upper housing is opened through an angle of substantially 360° with the upper housing remaining parallel to the lower housing.

12. The convertible device of claim 10, wherein a combination of the non-metallic structure and the metallic structure is formed substantially below the antenna slot when the convertible device is in closed position or when the upper housing is opened through an angle of substantially 360° with the upper housing remaining parallel to the lower housing.

13. The convertible device of claim 10, wherein the screen cover comprises:
  a metal body; and
  an antenna cover positioned in the antenna slot of the metal body, wherein the antenna cover is a plastic cover.

14. The convertible device of claim 10, wherein the base cover comprises a metal body, and wherein the antenna window is attached to the metal body to form the base cover.

* * * * *